(12) United States Patent
Makaran et al.

(10) Patent No.: US 6,798,162 B2
(45) Date of Patent: Sep. 28, 2004

(54) 12/42 VOLT DC BRUSH MOTOR CONTROL SYSTEM

(75) Inventors: John Makaran, London (CA); Ke Liu, London (CA)

(73) Assignee: Siemens VDO Automotive Inc., Mississauga (CA)

(*) Notice: Subject to any disclaimer, the term of this patent is extended or adjusted under 35 U.S.C. 154(b) by 40 days.

(21) Appl. No.: 10/197,100

(22) Filed: Jul. 17, 2002

(65) Prior Publication Data

US 2004/0012356 A1 Jan. 22, 2004

(51) Int. Cl.[7] .............................. H02P 1/18; H02P 7/638
(52) U.S. Cl. ...................... 318/442; 318/244; 318/245; 318/108; 320/140
(58) Field of Search ................................. 318/442, 244, 318/245, 108, 246, 138, 109, 805, 500, 505, 812, 828, 439; 363/15; 323/299; 307/10.1; 320/140

(56) References Cited

U.S. PATENT DOCUMENTS

| | | |
|---|---|---|
| 3,860,858 A | 1/1975 | Nola |
| 4,247,808 A | 1/1981 | Hanner |
| 4,354,223 A * | 10/1982 | Turnbull ..................... 363/124 |

(List continued on next page.)

FOREIGN PATENT DOCUMENTS

| | | |
|---|---|---|
| EP | 1198057 A2 | 4/2002 |
| EP | 1211791 A1 | 6/2002 |

OTHER PUBLICATIONS

Guru & Hiziroglu, (Electric Machinery and Transformers 2nd Edition, Copyright © 1995, Oxford University Press, pp. 335–337 and 649–650.*
PCT International Search Report in International Application No. PCT/CA 03/01064 mailed Nov. 7, 2003.
Caricchi F et al: "Study of bi-directional buck-boost converter topologies for application in electrical vehicle motor drives" Applied Power Electronics Conference and Exposition, 1998, APEC. '98 Conference Proceeding 1998. Thirteenth Annual Anaheim, CA. USA Feb. 15–19, 1998, New York, NY, USA, IEEE, US. IEEE, Feb. 15, 1998, pp. 287–293, XP010263608 ISBN: 0–7803–4340–9 Abstract; figures 13, 14.

*Primary Examiner*—Robert Nappi
*Assistant Examiner*—Eduardo Colon Santana

(57) ABSTRACT

A system 10 provides a variable output voltage to a DC brush motor. The system includes a DC brush motor 14, a DC voltage source 12, a step-up, step-down DC/DC converter 16 including a switch 18. The DC/DC converter is constructed and arranged to step-up and step-down voltage from the source to provide an output voltage to the motor between 0 and 42 volts. A control unit 22 is constructed and arranged to receive an input signal 20 and to control the switch based on the input signal to control the motor.

8 Claims, 2 Drawing Sheets

U.S. PATENT DOCUMENTS

| | | | | |
|---|---|---|---|---|
| 4,357,729 A | * | 11/1982 | Vander Molen et al. | 318/434 |
| 4,494,180 A | | 1/1985 | Streater et al. | |
| 4,665,350 A | | 5/1987 | Angi et al. | |
| 4,920,475 A | * | 4/1990 | Rippel | 363/132 |
| 5,117,167 A | * | 5/1992 | Kazmirski | 318/439 |
| 5,161,097 A | * | 11/1992 | Ikeda | 363/124 |
| 5,179,508 A | * | 1/1993 | Lange et al. | 363/16 |
| 5,296,796 A | | 3/1994 | Clower | |
| 5,334,926 A | * | 8/1994 | Imaizumi | 320/104 |
| 5,395,293 A | | 3/1995 | Matsuura et al. | |
| 5,694,010 A | | 12/1997 | Oomura et al. | |
| 5,724,205 A | | 3/1998 | Choi | |
| 5,764,007 A | * | 6/1998 | Jones | 318/109 |
| 5,801,498 A | * | 9/1998 | Kusano et al. | 318/139 |
| 5,811,948 A | * | 9/1998 | Sato et al. | 318/434 |
| 5,886,422 A | | 3/1999 | Mills | |
| 6,037,726 A | | 3/2000 | Tabata et al. | |
| 6,054,818 A | | 4/2000 | Tabata et al. | |
| 6,111,768 A | * | 8/2000 | Curtiss | 323/267 |
| 6,153,993 A | | 11/2000 | Oomura et al. | |
| 6,239,996 B1 | | 5/2001 | Perreault et al. | |
| 6,314,006 B1 | | 11/2001 | Berberich et al. | |
| 6,316,895 B1 | | 11/2001 | Ramarathnam | |
| 6,317,343 B1 | | 11/2001 | Okamura et al. | |
| 6,343,021 B1 | | 1/2002 | Williamson | |
| 6,370,050 B1 | | 4/2002 | Peng et al. | |
| 6,396,244 B2 | | 5/2002 | Shamoto et al. | |
| 6,426,569 B1 | * | 7/2002 | Ichikawa et al. | 307/10.1 |
| 6,459,170 B1 | * | 10/2002 | Tamai et al. | 307/48 |
| 6,476,315 B2 | * | 11/2002 | Ganz | 388/935 |
| 6,476,571 B1 | * | 11/2002 | Sasaki | 318/139 |
| 6,522,034 B1 | * | 2/2003 | Nakayama | 307/10.1 |

* cited by examiner

12/42 VOLT DC BRUSH MOTOR CONTROL SYSTEM

FIELD OF THE INVENTION

The invention relates to DC brush motor control system and, more particularly, to a control system to provide variable speed drive for both 12 and 42 volt motors in automobile applications using 12 or 42 volt batteries.

BACKGROUND OF THE INVENTION

With the shift of vehicle voltage systems from 12V to 42V there will be a need for 42V brush motors. Consequently, the development of 42V DC brush motors may be required for different applications, such as engine cooling and HVAC fan modules, etc. Currently, there is no such motor in serial production. As a result, it is anticipated that the change in voltage will facilitate the need for extensive validation of the higher voltage motors.

At the same time, there exists a need for intelligent variable speed 12V motors with high efficiency. One manner to deal with both scenarios and development risks is to design a 42V motor that can also be used in 12V system. On the other hand, it will be very helpful for validation of the 42V system if the existing 12V motors can be used in the system.

Thus, there is a need to provide a novel DC brush motor control system permitting a variable speed drive suitable to any combination of the 12V and 42V batteries and motors.

SUMMARY OF THE INVENTION

An object of the invention is to fulfill the need referred to above. In accordance with the principles of the present invention, this objective is achieved by a system that provides a variable output voltage to a DC brush motor. The system includes a DC brush motor, a DC voltage source, a step-up, and step-down DC/DC converter including a switch. The DC/DC convener is constructed and arranged to step-up and step-down voltage from the source to provide an output voltage to the motor between 0 and 42 volts. The system includes a control unit constructed and arranged to receive an input signal and to control the switch based on the input signal to control the motor.

In accordance with another aspect of the invention a method provides a variable output voltage to a DC brush motor. The method provides a DC voltage of 12 volts. The DC voltage is stepped-down to a first output voltage between 0 and 12 volts, and the DC voltage is stepped-up to a second output voltage between 12 and 42 volts to provide an output voltage range of 0–42 volts. An output voltage within the output voltage range is sent to a 42 volt DC brush motor.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF THE EXEMPLARY EMBODIMENT

Figure 1:
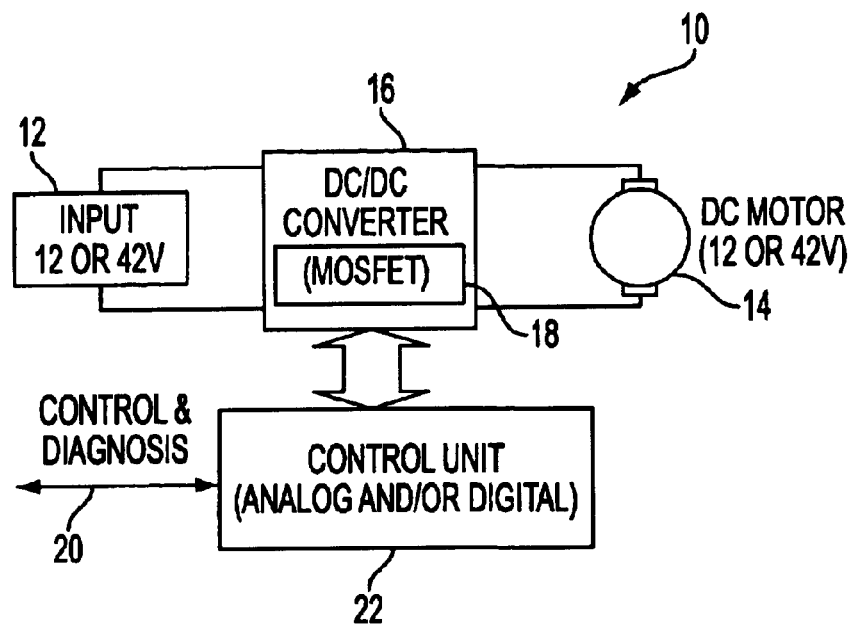
FIG. 1 is block diagram DC brush motor control system provided in accordance with the principles of the invention.

With reference to FIG. 1, an exemplary embodiment of a DC brush motor control system is shown, generally indicated at 10, in accordance with the principles of the present invention. The assembly 10 includes a voltage source 12 input, such as either 12V or 42V battery. A conventional DC brush motor 14 defines the load of the system 10. The motor 14 is either a 12V or a 42V design. A DC/DC converter 16 is provided that includes a switch 18, preferably a power MOSFET, the function of which will be explained below. The converter 16 is constructed and arranged to step-up and step-down the output voltage. An output voltage range of 0 to 12V can be used to control a 12V motor, and an output range of 0 to 42V can be used to control a 42V motor. Therefore, the system 10 can be used in any combination of the 12V and 42V batteries and motors.

A control and diagnosis input signal 20 provides communication between the motor control system 10 and a central engine control unit (ECU, not shown). The signal 20 is preferably a pulse width modulated (PWM) signal with a frequency of 100 to 300 Hz. The system 10 includes a control unit 22 having analog circuits and/or a microcontroller, which responds to the ECU, controls the MOSFET 18 in the DC/DC converter 16 to control the motor 14, and implements any protections so as to avoid motor damage.

The system 10 provides a step-up, step-down DC/DC converter 16 instead of a step down converter in traditional 12V motor control systems. Since the output voltage can be controlled either higher or lower than the input, the system 10 can be used in any combination of the 12V and 42V batteries and motors. Table 1 shows these applications.

TABLE 1

Combinations of 12 V and 42 V Batteries and Motors

| Operation of DC/DC converter | Battery Voltage | |
|---|---|---|
| | 12 V | 42 V |
| Motor Design 12 V | Output 0~12 V, step-down | Output 0~12 V, step-down |
| Motor Design 42 V | Output 0~12 V, step-down<br>Output 12~42 V, step-up | Output 0~42 V, step-down |

Three existing techniques of step up/down DC/DC converters are shown in Table 2. All these techniques can be applied in the proposed motor control system 10.

TABLE 2

Step Up/Down DC/DC Converters

| | Components | | | | |
|---|---|---|---|---|---|
| | MOSFET | Diode | Inductor | Capacitor | Vout/Vin |
| Buck-Boost | 1 | 1 | 1 | 1 | -D/(1-D) * |
| SEPIC | 1 | 1 | 2 | 2 | D/(1-D) * |
| CUK | 1 | 1 | 2 | 2 | -D/(1-D) * |

* D: duty cycle of the MOSFET, (conducting time)/(switching period).

The switching frequency of the MOSFET 18 is preferably selected higher than 18 kHz to avoid the acoustic noise. The motor speed is controlled by the output voltage of the DC/DC converter 16, which is determined by the duty cycle (D) of the MOSFET. Therefore, controlling the duty cycle (D) is one of the main tasks of the control unit 22.

The input and output signals in the control unit 22 and their functions are listed in Table 3.

TABLE 3

Input and Output Signals of Control Unit

| Name | Input/Output | From/to | Function |
|---|---|---|---|
| PWM Input | Input | From ECU | The command of motor speed |
| Diagnosis | Output | To ECU | Information of error |
| Motor Bit | Input | From User | Set by user, motor information, 0 = 12 V, 1 = 42 V |
| Battery Voltage | Input | From Measurement | D control, Over- and under-voltage protection |
| Battery Current | Input | From Measurement | Current control, Over-current protection |
| Driver signal | Output | To MOSFET | D control |
| Output Voltage | Input | From measurement | Voltage control, optional |

Figure 2:
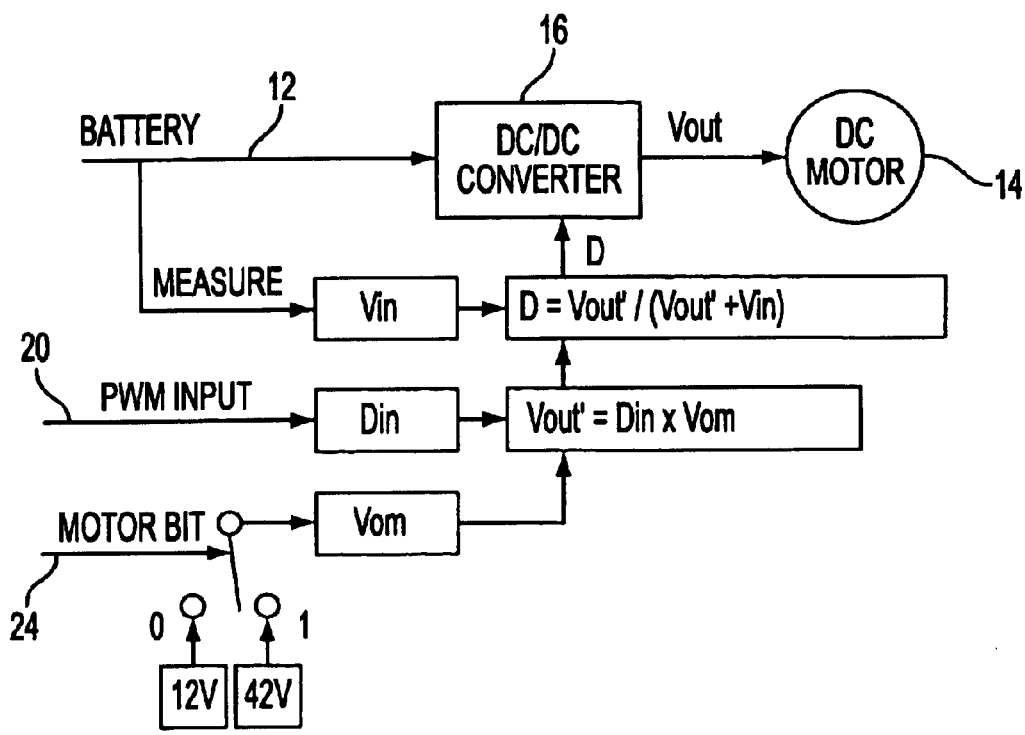
FIG. 2 is block diagram of open-loop D control to control the speed of the motor of the system of FIG. 1.
Figure 3:
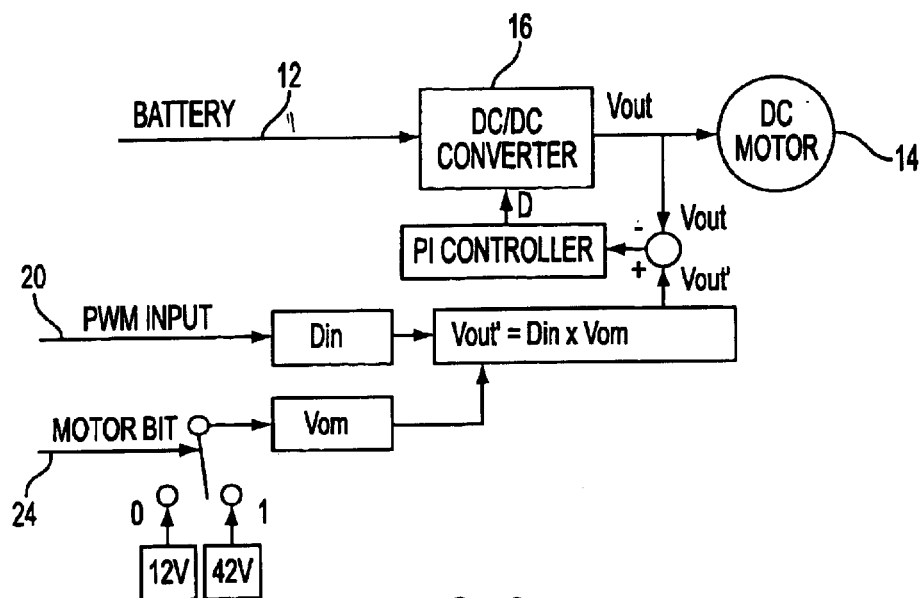
FIG. 3 is block diagram of closed-loop V control to control the speed of the motor of the system of FIG. 1.
Figure 4:
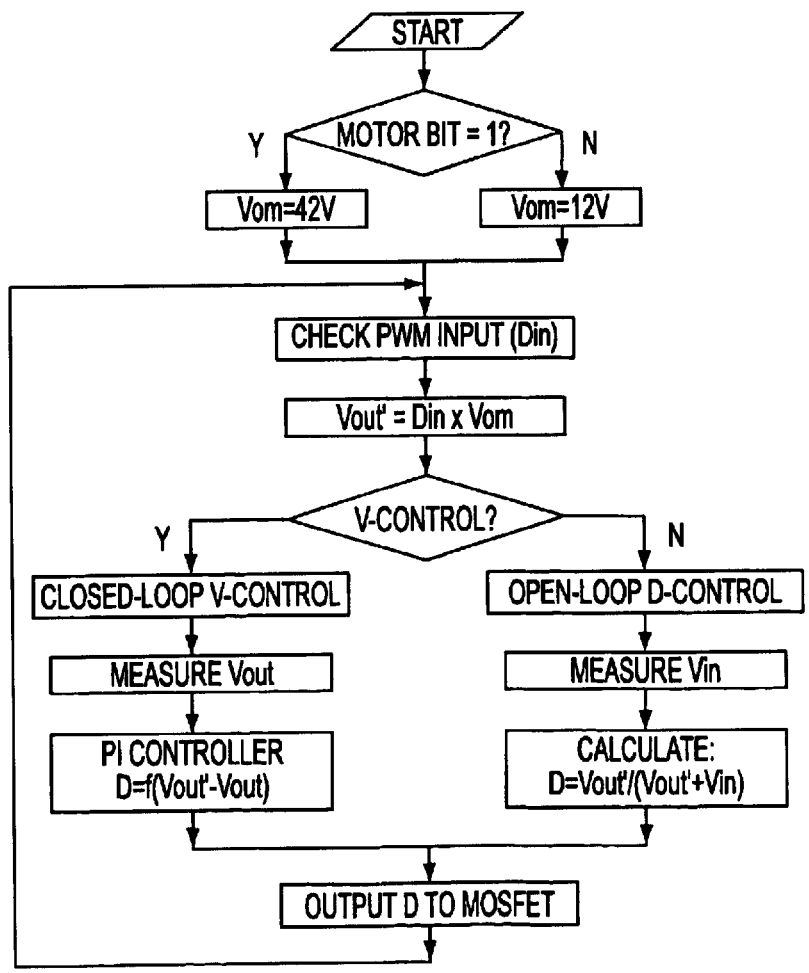
FIG. 4 is a flow chart of the operation of the control system of FIG. 1.

Two different control schemes can be implemented to control the motor speed, an open-loop duty cycle control (D-control) as shown in FIG. 2, or a closed-loop voltage control (V-control) as shown in FIG. 3. The system 10 will recognize the battery system (12 or 42V) automatically by measuring the input voltage (Vin). The motor bit 24, which needs be set by the user according to motor design (12 or 42V), determines the maximum output voltage (Vom). The duty cycle of the PWM input 20 (Din) tells the system 10 the set-point of the motor speed, which is proportional to the output voltage (Vout'). FIG. 4 shows a flow chart of the operation of the DC brush motor control system 10.

Some of the benefits of using the system 10 are:

I) flexibility of using 12V or 42V batteries and motors,

II) lower currents through the motor, resulting in lower conducted and radiated noise emissions, III) a potentially more efficient motor drive system.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A system for providing a variable output voltage to a DC brush motor comprising:

a DC brush motor, a DC voltage source, a step-up, step-down DC/DC converter including a switch, the DC/DC converter being constructed and arranged to step-up and step-down voltage from the source to provide an output voltage to the motor between 0 and 42 volts, and a control unit constructed and arranged to receive an input signal and to control the switch based on the input signal to control the motor, wherein the voltage source is 12 volts and the motor is a 42 volt motor and the DC/DC converter is constructed and arranged to step-down voltage from the source to an output voltage of 0 to 12 volts and to step-up voltage from the source to an output voltage of 12–42 volts.

2. A system for providing a variable output voltage to a DC brush motor comprising:

a DC brush motor, a DC voltage source, a step-up, step-down DC/DC converter including a switch, the DC/DC converter being constructed and arranged to step-up and step-down voltage from the source to provide an output voltage to the motor between 0 and 42 volts, and a control unit constructed and arranged to receive an input signal and to control the switch based on the input signal to control the motor, wherein the voltage source is 42 volts and the motor is a 42 volt motor and the DC/DC converter is constructed and arranged to step-down voltage from the source to an output voltage of 0 to 42 volts.

3. A method of providing a variable output voltage to a DC brush motor, the method including:

providing a DC voltage of 12 volts, stepping-down the DC voltage to a first output voltage between 0 and 12 volts, and stepping-up the DC voltage to a second output voltage between 12 and 42 volts, to provide an output voltage range of 0–42 volts, and sending an output voltage within the output voltage range to a 42 volt DC brush motor.

4. The method of claim 3, wherein the steps of stepping-down and stepping-up the DC voltage includes using a step-up, step-down DC/DC converter.

5. The method of claim 4, wherein the DC/DC converter includes a MOSFET, the method including controlling operation of the MOSFET to control the motor.

6. A method of providing a variable output voltage to a DC brush motor, the method including:

providing a DC voltage of 42 volts, stepping-down the DC voltage to a output voltage in the range of 0 to 42 volts, and sending an output voltage within the output voltage range to a 42 volt DC brush motor.

7. The method of claim 6, wherein the step of stepping down the DC voltage includes using a step up, step down DC/DC converter.

8. The method of claim 7, wherein the DC/DC converter includes a MOSFET, the method including controlling operation of the MOSFET to control the motor.

* * * * *